Nov. 1, 1932.  B. G. KUHNE  1,885,360
MOLD MANIPULATING APPARATUS
Filed July 26, 1927   3 Sheets-Sheet 3
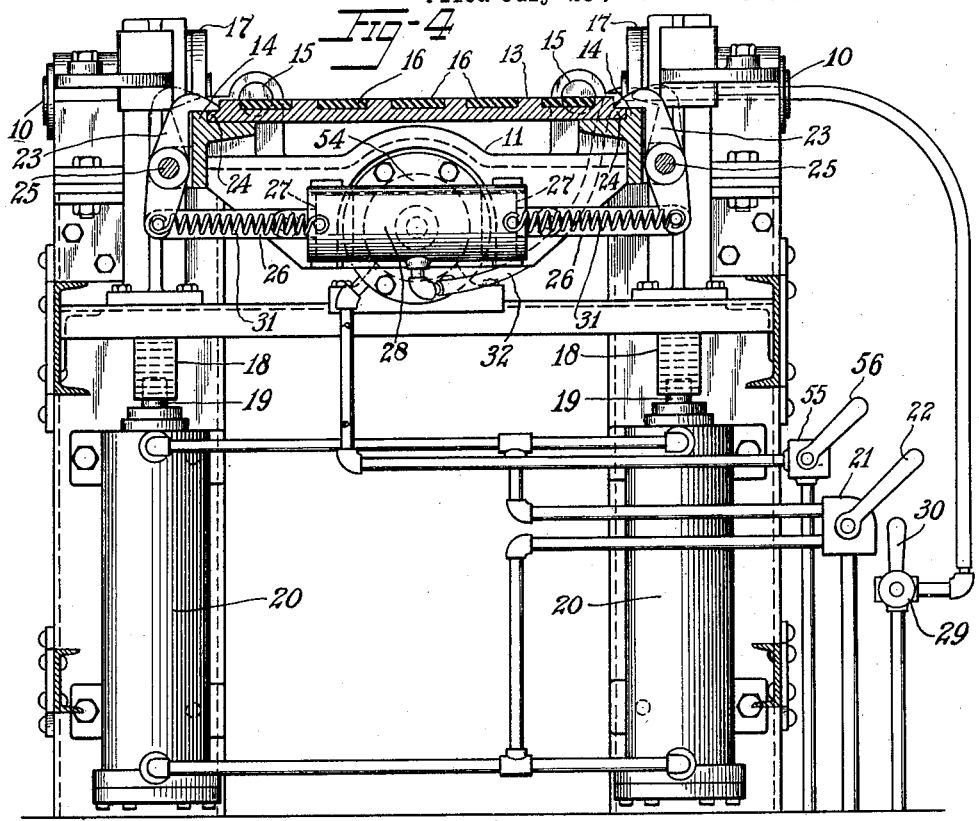
Inventor
Bernhard G. Kuhne
By Pierson, Eakin & Avery
Attys.

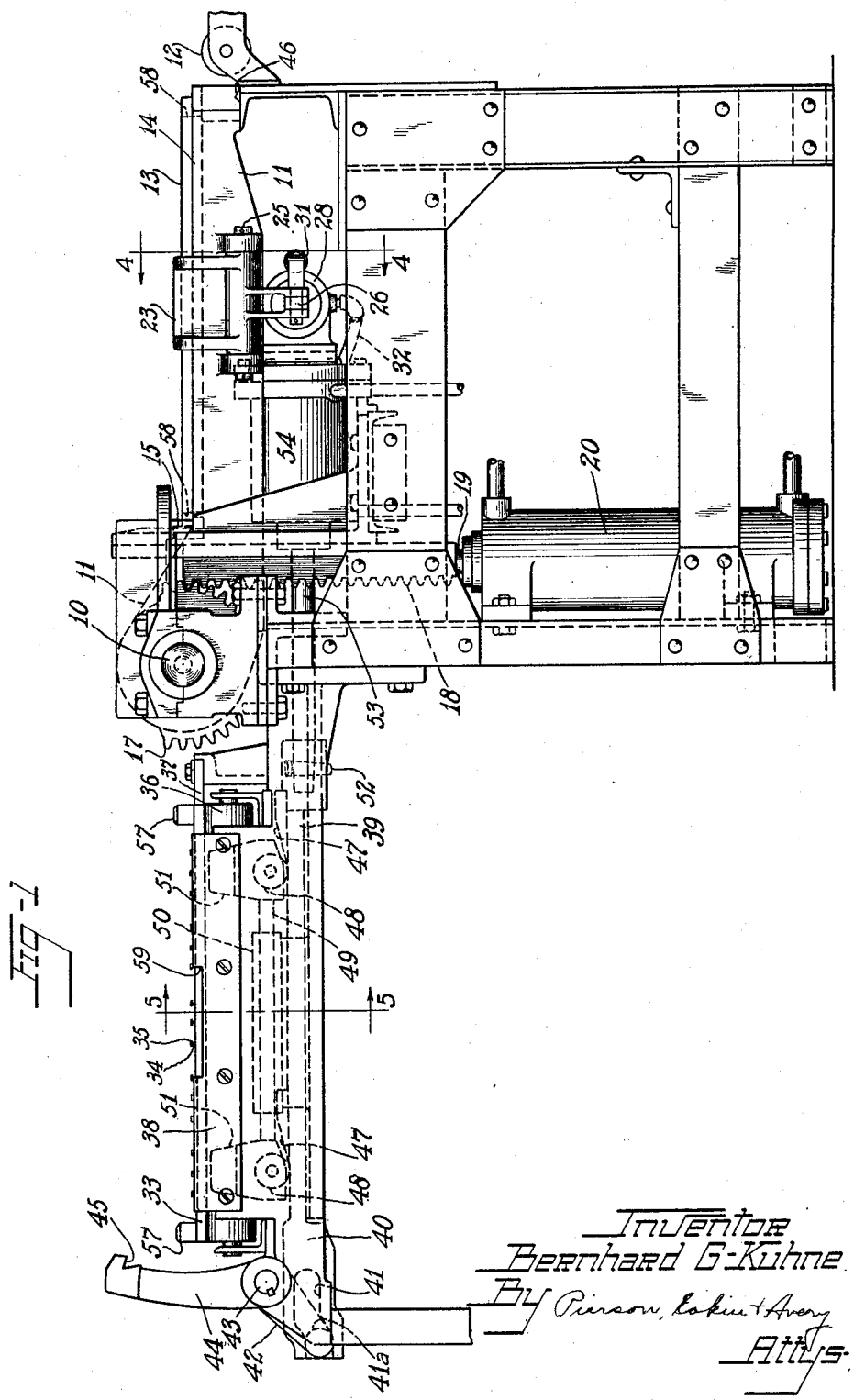

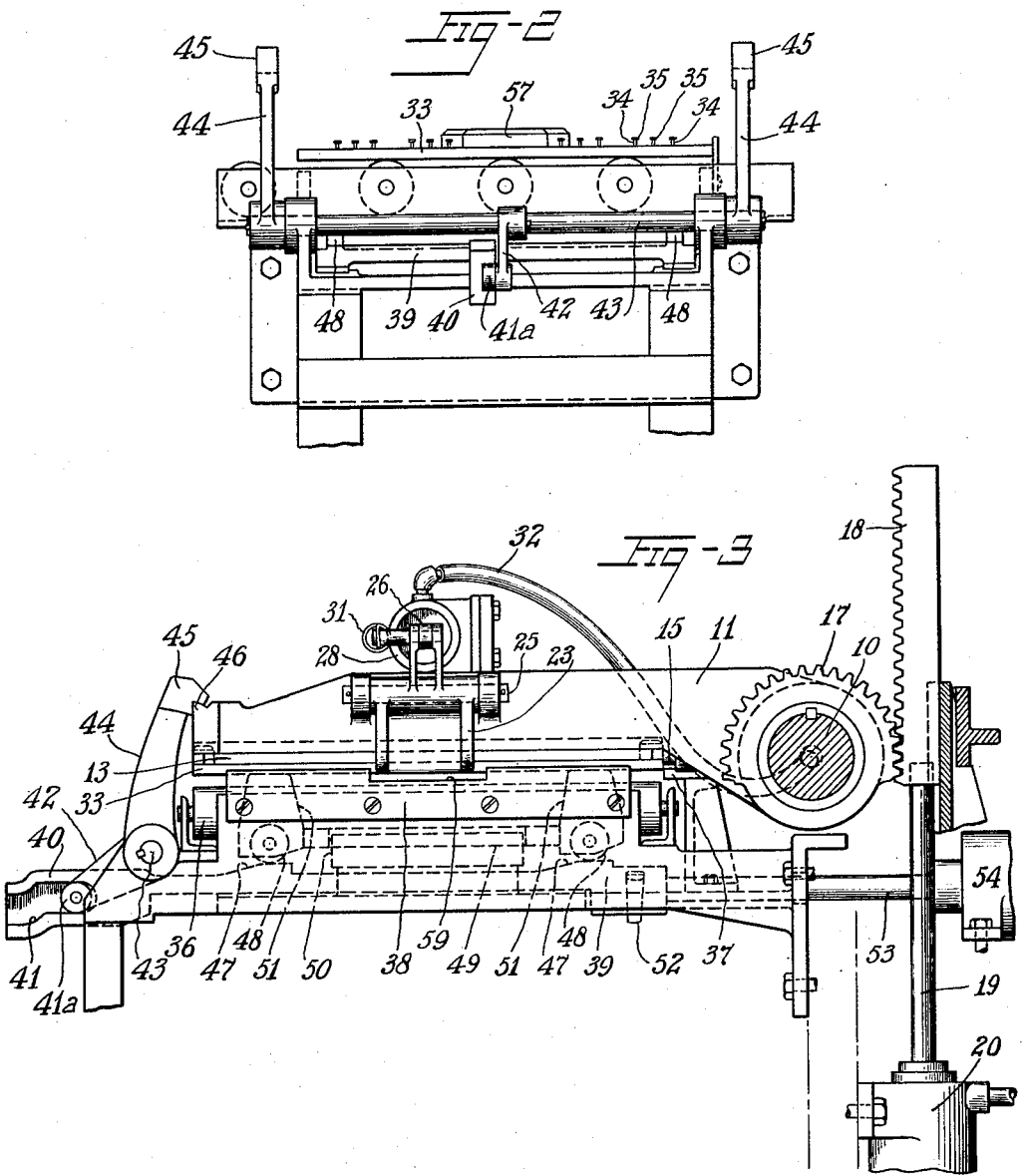

Patented Nov. 1, 1932

1,885,360

UNITED STATES PATENT OFFICE

BERNHARD G. KUHNE, OF AKRON, OHIO, ASSIGNOR TO THE B. F. GOODRICH COMPANY, OF NEW YORK, N. Y., A CORPORATION OF NEW YORK

MOLD MANIPULATING APPARATUS

Application filed July 26, 1927. Serial No. 208,563.

This invention relates to procedure and apparatus for manipulating sectional molds, as in associating with each other and pressing together a multiple-cavity rubber-heel mold section filled with plastic rubber compound and a cover-plate therefor having shouldered washer-supporting pins projecting from the molding areas of its face and having nail-anchoring washers mounted upon the shouldered pins for embedding the washers in the rubber compound constituting heel blanks in the mold cavities.

My chief objects are to provide economy of time and labor in the manipulation of the mold sections; to avoid the discomfort to the workmen of handling molds that are hot from a preceding vulcanizing operation; to provide accuracy and firmness in the closing of the molds; and to provide a method and apparatus well adapted for operation in conjunction with conveyor means for delivering the mold sections to and conveying them from the mold manipulating apparatus.

Of the accompanying drawings:

Fig. 1 is a side elevation of apparatus embodying and adapted to carry out my invention in its preferred form, with a mold-turning frame constituting a part thereof in mold-receiving position.

Fig. 2 is an elevation of the same from the left of Fig. 1.

Fig. 3 is an elevation of parts of the apparatus, from the same view-point as Fig. 1, with the mold-turning frame in mold-closing position.

Fig. 4 is a section on line 4—4 of Fig. 1.

Fig. 5 is a section on line 5—5 of Fig. 1.

Referring to the drawings, the machine comprises a framework in which is journaled at 10 a mold-turning frame 11 adapted, in the position in which it is shown in Fig. 1, to rest at its outer end upon a part of the framing adjacent the terminal roll 12 of a conveyor which is adapted to deliver to the frame a mold section such as the cavitied section 13 of a two-part heel mold. The mold-turning frame 11 is formed with suitable side flanges 14, 14 and provided with adjustable stop members 15, 15 for positioning the mold section thereon. The cavities of the mold, with heel blanks 16, 16 therein, are shown clearly in Fig. 4, the heel blanks here shown being so formed as completely to fill the cavities, as by extruding the rubber into the cavities and shearing it off at the mouths of the cavities.

Secured upon the trunnions of the frame 11 are respective segmental gears 17, 17 meshed with respective racks 18, 18 which are mounted upon the upper ends of the piston rods 19, 19 of respective vertical fluid pressure cylinders 20, 20 which are provided with suitable fluid connections, including a four-way valve 21 having a control handle 22, for actuating the cylinders to turn the frame 11 over from its horizontal mold-receiving position of Fig. 1 to its horizontal, inverted mold-closing position of Fig. 3, and to return it to its first mentioned position.

For retaining the mold 13 upon the frame 11 in inverted position during the turning movement a pair of latching levers 23, 23, having lateral projections adapted to take over the flanges 14 of the frame and over side flanges 24, 24 formed upon the mold, are pivoted upon the frame at 25, 25, as shown clearly in Fig. 4, and their rear arms are connected by connecting rods 26, 26 with respective pistons 27, 27 mounted in a single cylinder 28 which is mounted upon the frame 11, the cylinder being provided with suitable connections, including a three-way valve 29 and a control handle 30 therefor, for charging the cylinder between the two pistons and thus turning the levers 23 into latching position and for venting the cylinder to permit the levers 23 to be withdrawn from latching position by pull springs 31, 31 connecting the respective levers 23 with the cylinder. The immediate fluid connection to the cylinder 28 includes a flexible pipe 32 extending through an axial aperture formed in one of the trunnions of the frame 11, so that the cylinder may be swung over with the mold-turning frame 11 from mold-receiving to mold-closing position while continuing to be charged.

A mold cover-plate for association with the mold 13 is shown at 33, the plate having shouldered washer-supporting pins 34, 34 projecting from the molding areas of its surface and having mounted thereon nail-anchoring washers 35, 35 to be embedded in the heel blanks 16.

For holding the cover-plate 33 in position for association with the mold 13 upon the reception of the latter in the mold-closing position suitable supports are provided which may comprise rolls 36, 36 of a conveyor which is adapted for the removal of the mold assembly after the mold-closing operation. Suitable means such as a rubber bumper 37 and a positioning plate 38 are provided for positioning the cover-plate 33 on the rolls.

For holding the mold-turning frame 11 down in horizontal position for the reception of the cover-plate from below, and for raising the cover-plate to force the washer-supporting pins 34 and the washers 35 thereon into the heel blanks and to close the mold, a slide 39 is mounted in suitable guide-ways formed in the framing and has an extension 40 formed with a cam slot 41 occupied by a cam roller 41$^a$ journaled on the free end of a rocker-arm 42 which is secured to the medial portion of a rock-shaft 43, the latter being journaled in the stationary framework of the machine, and having latching levers 44, 44 secured upon its respective end portions. Each of the levers 44 has a notched end portion 45 adapted to take over a complemental flange 46 (see Fig. 3) formed on the outer end of the mold-turning frame, the form of the cam groove 41 being such as to cause the latching portions 45 of the levers 44 to engage the frame and thereafter to permit further movement of the slide 39.

The slide 39 is formed on its upper face with inclined cams 47, 47 adapted in such further movement of the slide to run under respective wheels 48, 48 journaled in a lifting frame 49 which is mounted for vertical sliding movement upon vertical guide standards 50, 50 rising from the framing, and the lifting frame is formed with four upstanding projections 51, 51 adapted to engage the cover-plate 33 to lift it and press it against the inverted mold 13. The slide 39 is connected by a pin 52 to the end of the piston rod 53 of a stationary fluid pressure cylinder 54 which is mounted upon the framing and provided with suitable connections, including a four-way valve 55 and a control handle 56 therefor, for actuating the cylinder in both directions.

The cover-plate 33 may be provided with suitable dowels 57, 57 adapted to enter recesses such as the recesses 58, 58 formed in the respective marginal portions of the mold 13 for accurately positioning the mold and cover-plate with relation to each other. The mold-cover positioning plate 38 is formed with a notch 59 to accommodate the adjacent mold-retaining lever 23.

In the operation of the device, the mold-turning frame being in the mold-receiving position of Fig. 1, the mold 13 is shoved thereonto, between the flanges 14 and against the stops 15, from the conveyor roll 12, either by hand or permissibly by the mold-filling mechanism (not shown), the latching levers 23 being held with their mold-engaging ends spread apart by the pull springs 31. The cover-plate 33 is shoved into position, against the plate 38 and the bumper or stop 37, upon the conveyor rolls 36, the lifting frame 49 being in its lowermost position and the latching levers 44 being held in their inoperative positions, the slide 39 being retracted.

The latching levers 23 are then caused to take over the mold 13 by turning the control handle 30 of the valve 29, after which the lower ends of the cylinders 20 are charged by movement of the valve handle 22, which raises the racks 18 and swings the mold-turning frame 11 over from the mold-receiving position of Fig. 1 to the mold-closing position of Fig. 3. The slide 39 is then moved to the left as viewed in Figs. 1 and 3 by moving the valve handle 56 and thus reversing the cylinder 54, which first causes the latching levers 44 to take over the outer end of the mold-turning frame 11 and then, through the co-action of the cams 47 with the wheels 48, raises the lifting frame 49 and thereby raises the cover-plate 33 from the conveyor rolls 36 and forces it against the mold 13, the heel washers 35 being forced into the heel blanks 16 by the washer-supporting pins 34 upon which they are mounted.

The mold thus being closed, the cylinder 28 is exhausted, which disengages the latching levers 23 from the mold 13, the cylinder 54 is reversed, which lowers the closed mold onto the conveyor rolls 36 and withdraws the latching levers 44 from the frame 11, and the cylinders 20 are then reversed, which returns the mold-turning frame 11 to mold-receiving position, for a repetition of the operation as described.

My invention thus provides the several advantages set out in the above statement of objects and it may be variously modified within the scope of the appended claims.

I claim:

1. Mold-manipulating apparatus comprising a mold-turning frame hinged to turn on a horizontal axis, means for turning the said frame over its hinge axis from one substantially horizontal position to another, and means on said frame for releasably grasping a mold section and holding it in association therewith in such turning movement.

2. Apparatus as defined in claim 1 including reciprocable means for presenting a second mold section from below to a mold section held inverted by the mold-turning frame.

3. Mold manipulating apparatus comprising means for supporting a detached mold section in a determinate position, a structure for supporting a second detached mold section, mechanism for moving said structure in an arcuate path to a position presenting said second mold section in parallel, face to face relation with the first said mold section, and means for moving the first said mold section into engagement with the second mold section.

4. Mold manipulating apparatus comprising means for supporting a detached mold section in a determinate position, mold turning means for supporting a second detached mold section in an adjacent determinate position, the mold turning means being mounted to swing through an arc of approximately 180° to invert the second mold section over the first said mold section in parallel face to face relation thereto, and means for moving the first said mold section into engagement with the second mold section.

5. Mold manipulating apparatus comprising a structure for supporting a detached mold section placed thereon, quickly releasable means for securing the mold section to said structure in predetermined relation thereto, mechanism for moving said structure in an arcuate path from a mold section receiving position to a mold assembly position, and means for moving a second mold section into engagement with the first said mold section at said assembly position.

6. Mold manipulating apparatus comprising a structure for supporting a detached mold section placed thereon, quickly releasable means for securing the mold section to said structure in predetermined relation thereto, mechanism for moving said strucsture from a mold section receiving position to a mold assembly position, quickly releasable means for clamping said structure in the mold assembly position, and means for moving a second mold section into engagement with the first said mold section at said assembly position.

7. Mold manipulating apparatus comprising a pivoted mold turning frame having a portion located to one side of the pivot for supporting a detached mold section placed thereon, means for releasably grasping a mold section so placed and holding it in association with said frame portion, means for turning said frame about its axis to swing the mold section bodily in an arcuate path from a receiving position to a mold assembly position and means for moving another mold section into engagement with the first said mold section at the assembly position.

8. Mold manipulating apparatus comprising a pivoted mold turning frame having a portion located to one side of the pivot for supporting a detached mold section placed thereon, means for releasably grasping a mold section so placed and holding it in association with said frame portion, and means for turning said frame about its axis to swing the mold section bodily from one horizontal position to another.

9. Apparatus of the class described comprising, in combination, a detached mold section having a mold cavity in its face, a second detached mold section adapted to mate therewith and having a projecting washer-supporting pin adapted to place a washer supported thereon in a determinate position in the mold cavity on assembly of the mold sections, means for supporting the first said section and for moving it in an arcuate path to a position over the said second section in parallel, face to face relation thereto, and means for moving the said second section into assembled engagement with the first said section.

10. Apparatus of the class described comprising, in combination, a detached mold section having a mold cavity in its face, a second detached mold section adapted to mate therewith and having a projecting washer-supporting pin adapted to place a washer supported thereon in a determinate position in the mold cavity on assembly of the mold sections, means for supporting the said second section in a determinate positon, means for supporting the first said section and for inverting it over the said second section in parallel, face to face relation thereto, and means for moving the said second section into assembled engagement with the first said section.

In witness whereof I have hereunto set my hand this 23rd day of July, 1927.

BERNHARD G. KUHNE.